United States Patent
Haas et al.

(10) Patent No.: US 7,586,627 B2
(45) Date of Patent: Sep. 8, 2009

(54) METHOD AND SYSTEM FOR OPTIMIZING PRINT-SCAN SIMULATIONS

(75) Inventors: Bertrand Haas, New Haven, CT (US); Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 614 days.

(21) Appl. No.: 11/241,293

(22) Filed: Sep. 30, 2005

(65) Prior Publication Data
US 2007/0076948 A1 Apr. 5, 2007

(51) Int. Cl.
*G06F 3/12* (2006.01)
(52) U.S. Cl. .................. 358/1.1; 358/1.9; 358/1.13; 358/3.28; 382/100; 382/168; 382/169
(58) Field of Classification Search ......... 382/168; 358/1.9
See application file for complete search history.

(56) References Cited
U.S. PATENT DOCUMENTS

| | | | | |
|---|---|---|---|---|
| 5,606,432 A | * | 2/1997 | Ohtsuka et al. | ............ 358/527 |
| 6,717,700 B1 | * | 4/2004 | Sanderson et al. | ......... 358/3.21 |
| 2001/0044899 A1 | * | 11/2001 | Levy | ........................ 713/176 |
| 2002/0054355 A1 | * | 5/2002 | Brunk | ........................ 358/3.28 |
| 2006/0002583 A1 | * | 1/2006 | Reed et al. | .................. 382/100 |
| 2008/0301767 A1 | * | 12/2008 | Picard et al. | ................... 726/2 |

* cited by examiner

*Primary Examiner*—Mark K Zimmerman
*Assistant Examiner*—Kent Yip
(74) *Attorney, Agent, or Firm*—George M. Macdonald; Angelo N. Chaclas

(57) ABSTRACT

Systems and methods for utilizing a known histogram of a particular category of images to constrain a probabilistic print-scan model in order to provide a more accurate print-scan model are described. A probability function is defined that given a two-dimensional grayscale bitmap input image provides the probability that a particular pixel of the input image will have a particular gray level in the output image after print-scan processing. Additionally, an expected target histogram is input into the system and used to constrain or modify the probabilistic print-scan model for the input image to produce a deterministic print-scan model.

11 Claims, 3 Drawing Sheets

METHOD AND SYSTEM FOR OPTIMIZING PRINT-SCAN SIMULATIONS

FIELD OF THE INVENTION

The present invention relates to systems and methods for optimizing models of printing and scanning processes, and in particular in certain embodiments to systems and methods for optimizing probabilistic print-scan simulations using histogram constraints for any category of images having similar or identical histograms.

BACKGROUND OF THE INVENTION

Digital documents and images (herein images) typically exist in the digital realm as a formatted file including a bitmap of pixels. The images may be represented in a particular format and may include color images represented in a particular color space and format, grayscale images and monochrome images. In the case of vector based image representations, such representations could be converted to bitmap representation.

There are many known issues and concerns regarding accuracy in transforming a digital image to a physical image using a particular output device such as a printer and a particular medium such as paper, particularly with regard to color matching. Furthermore, it may be desirable to convert a physical image to a digital form using an image capture or scanning device (herein scanner). Similarly, there are concerns regarding accuracy of such transformation from a physical image to a digital image. For example, physical effects of the printing process that distort the output of the printing process vary by printing technology but include ink bleeding for inkjet printing systems and thermal heating effects for thermal printing systems. Similarly, physical effects associated with scanning distort the physical to digital transformation including scanning resolution limitations (particularly in scanning continuous analog images), scanning grid mismatch (for scanning digital pixels) and color mismatch for color images.

In order to predict the effects of such physical transformations for a particular digital image, printer and scanner, print-scan models may be developed to predict the resulting distortion. In some cases, devices such as thermal printers may modify the next print row in local memory before printing it to compensate for thermal heating effects. Scanner manufactures may provide adjustable software controls to deal with effects such as gamma correction. Image enhancement features included by printer and scanner manufacturers generally aim to improve the appearance of the image to the human visual system, rather than to increase the accuracy of the transformation of the image from digital to analog form and back to digital.

In the area of copy detection for physical documents, systems are known including copy detection patterns (CDPs) that may be placed in a particular region of a document reserved for the purpose. Furthermore, several copy detection systems are known that utilize visible and invisible digital watermarks (fragile and/or robust) that are applied to an image. Commercially available systems include those available from Digimarc Corporation of Beaverton, Oreg. and Mediasec Technologies, LLC of Providence, R.I. Print-scan models may be useful in watermarking verification systems in predicting what a recovered watermark should look like after passing through one or more print-scan processes or copy generations. A system for utilizing print-scan compensation in a watermarking method is described in commonly-owned, co-pending patent application Ser. No. 10/720,503, filed Nov. 23, 2003 entitled Watermarking Method With Print-Scan Compensation, which is incorporated herein by reference. A system using printer and scanner characteristics is show in U.S. Pat. No. 6,947,179 B1, issued Sep. 20, 2005 to Cordery, et al., entitled Method for determining the information capacity of a paper channel and for designing or selecting a set of bitmaps representative of symbols to be printed on said channel.

Traditional print-scan simulation models attempt to balance many effects of the physical print-scan process in an attempt to predict the resulting physical transformations. However, such models are typically not completely accurate, because they approximate the print-scan process and often produce predictions that are not very accurate. Furthermore, there are no known print-scan modeling systems for modeling a system that uses the same types of printers and scanners to process a particular category of images that have similar histograms. Additionally, traditional histogram matching processes are computationally difficult and not very accurate.

Accordingly, there is a need for a print-scan simulation modeling process and model for providing more accurate print scan models and simulations. Additionally, there is a need for a print-scan simulation modeling process and model for providing more accurate print scan models and simulations for systems using same types of printers and scanners to process a particular category of images that have similar histograms. Furthermore, there is a need for a print-scan simulation modeling process and model for providing histogram constrained print-scan models using a computationally efficient process.

SUMMARY OF THE INVENTION

The present invention provides systems and methods for providing more accurate print-scan models and simulations, and in certain embodiments to systems and methods for providing a print-scan simulation modeling process and model that results in more accurate print-scan models and simulations for systems using same types of printers and scanners to process a particular category of images that have similar histograms. In certain further embodiments, efficient histogram matching processes are utilized.

In one illustrative embodiment, the system utilizes a known histogram of a particular category of images to constrain a probabilistic print-scan model in order to provide a more accurate print-scan model. A probability function is defined that given a two-dimensional grayscale bitmap input image provides the probability that a particular pixel of A will have a particular gray level g. Additionally, an expected target histogram is input into the system and used to constrain or modify the probabilistic print-scan model for input image A to produce a deterministic print-scan model. The constrained model predicts the output image produced from input image A with generally more accuracy than simply selecting the highest probability gray level for each pixel from the probabilistic model.

In one illustrative embodiment, the system indexes the pixels of A with index k in one dimension such as by vectorizing or stacking columns of the two dimensional bitmap or by using some other transform. Accordingly, the probability function can be represented itself as a three dimensional histogram H of values p for indices k and g. The system applies an iterative process in which the highest probability p is selected. For the selected p, the corresponding output pixel of B is filled with g. Then, all remaining pairs of H having pixel value k are removed from H. Furthermore, if using that gray level g reached the expected number of pixels of that gray level in the histogram of B, then all remaining pairs of H having that gray level g are removed from H. The process then returns to pick the next highest probability until B is completely filled.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Commercially available watermarking and copy detection pattern (CDP) based copy detection systems typically retrieve verification images using a flatbed scanner. Those verification images may then be compared to an expected image to see if they correlate for purposes such as copy detection. Such systems may apply a print-scan model to manipulate the verification image before the correlation to remove unwanted effects of the print-scan process. In some cases, the scanner is known to the verification system and information regarding the printer used may be embedded in the verification image. Such traditional print-scan models may not be very accurate. Furthermore, histogram matching techniques are known in which a target image is manipulated to match a target histogram. Such traditional histogram matching processes may not be very accurate and are not necessarily computationally efficient.

In the embodiments described herein, an improved print-scan model is described that utilizes the knowledge that the same type of printer and scanner are used and a probabilistic print-scan model is available for the printer-scanner pair. Furthermore, the verification image belongs to a category of images that has a known particular histogram. The improved print-scan model described modifies the known probabilistic print-scan-model for the particular printer-scanner pair to incorporate a histogram matching process to provide more accurate print-scan modeling predictions. Additionally, a computationally efficient histogram matching process is described.

The illustrative embodiments described herein process a simple small grayscale image with a known histogram for the purposes of clarity and brevity. Alternatively, a much more complex image such as a psuedo-random CDP can be utilized. As can be appreciated, the illustrative embodiments described herein may be alternatively applied to other types of images such as binary monochrome, color images and line art. Furthermore, the input image may be selected from a category of images having a known histogram or an input image can be generated to match the histogram.

It is an object of the present application to describe a print-scan simulation modeling process and model for providing more accurate print scan models and simulations. It is a further object of the present application to describe a print-scan simulation modeling process and model for providing more accurate print scan models and simulations for systems using same types of printers and scanners to process a particular category of images that have similar histograms. It is yet a further object of the present application to describe a print-scan simulation modeling process and model for providing histogram constrained print-scan models using a computationally efficient process.

Figure 1:
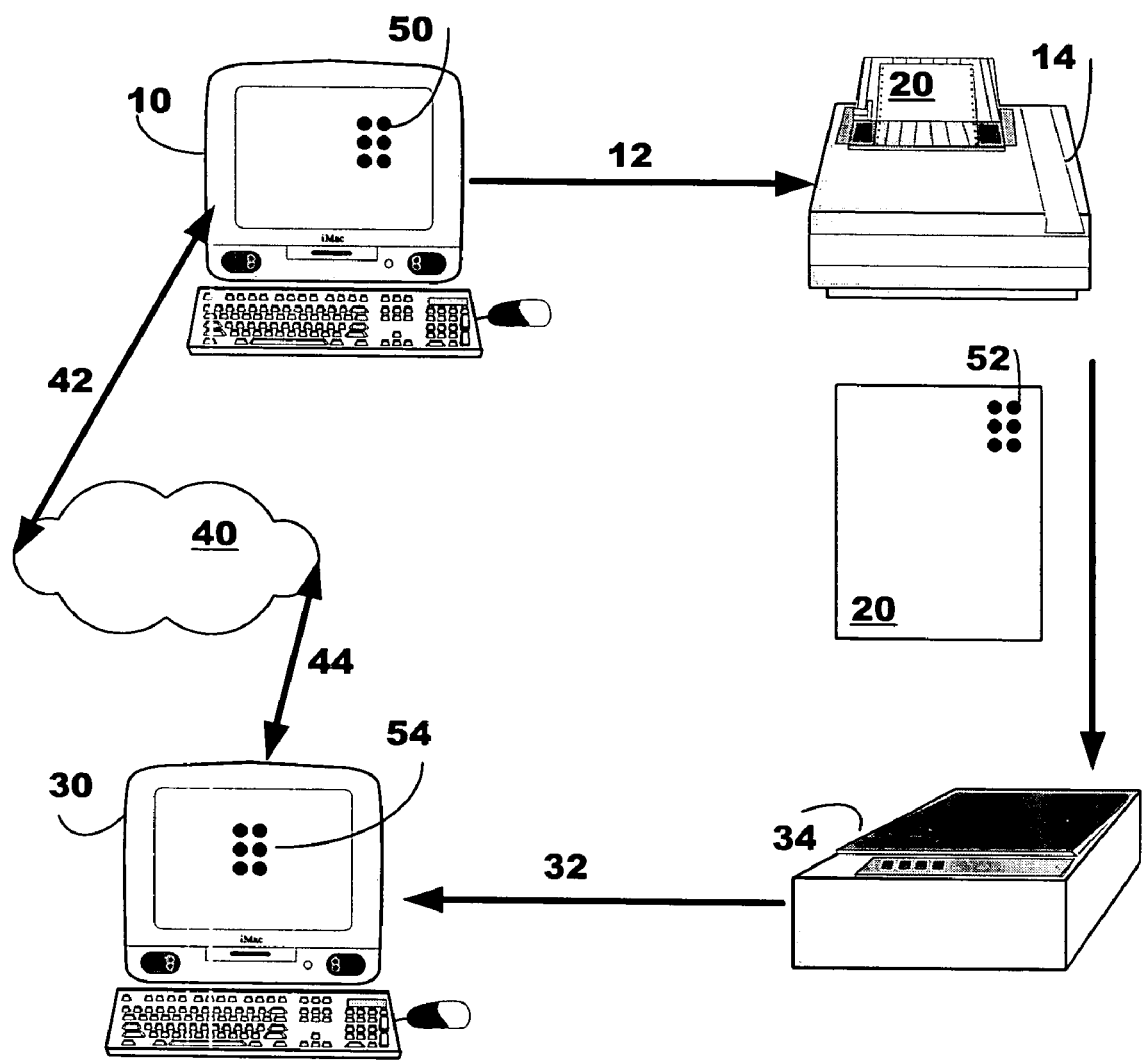
FIG. 1 is a block diagram of a system for processing print-scan transformations of an image according to an illustrative embodiment of the present application.

Referring to FIG. 1 a block diagram of a system 1 for processing print-scan transformations of an image according to an embodiment of the present application is shown. An original image 50 creation system 10 is connected to a printer 14 using communications channel 12 such as a USB cable. The system performs the physical transformation of printing the image 52 on media 20 by printing it with a given type of printer 14 (the official printer). In this illustrative embodiment, the original image 50 is a 2×3 bitmap having three possible grayscale levels (0-2).

The image 52 on the media may enter circulation to arrive at a processing (such as verification) scanner 34. Unfortunately, while in circulation, unscrupulous individuals might make an unauthorized copy of the media 20. Such fraudulent copies are usually scanned and reprinted with high quality devices. The document (or its unauthorized copy) is then scanned at the verification system with a given type of scanner 34 (the official scanner) and the image 54 may be recovered in order to analyze it to detect whether it (and therefore the whole document) has been copied or not. Accordingly, it would be useful to accurately predict the effects of one or more print-scan manipulations in order to accurately predict whether the verification scan is a copy.

In this embodiment, the scanner 34 is connected to the verification personal computer 30 using communications channel 32 such as a USB cable. In an alternative, the scanner is an image capture device such as a CCD camera. The personal computers 10, 30 are DELL, PENTIUM 4 based computers running WINDOWS XP. Alternatively, Apple G5 computers may be used. The applications described herein are programmed in MATLAB, but could alternatively be programmed in a general-purpose high-level computer language or assembly code. Other known computing systems, programming systems, communications systems and security systems may be utilized.

The processing applications described herein may be performed entirely on creation computer 50, the verification computer 54, some other data processor or a combination of them. The improved print-scan models described may be used in a predictive manner to manipulate source images in order to provide more accurate physical representations or may be applied to physically recovered images to more accurately allow correlation to an expected image. If a comparison application is intended, the original image file 50, or information sufficient to generate the image file 50, could be transmitted from the creation computer 10 to the verification computer 30 using communication channels 42, 44 and network 40. Network 40 comprises the Internet, but other networks may be used.

In certain applications such as postal indicia processing, the type of printer used to print an indicium such as a particular thermal printer using a particular type of thermal print media may be known. Similarly, the type of verification scanner such as a postal authority scanner may be known. Accordingly, it is possible to create a probabilistic print-scan model of the known printer-scanner type pair for input images A. Furthermore, if a portion of a postal indicia includes an image with a known histogram such as a copy detection pattern, that probabilistic print-scan model can be improved as described herein to be constrained by the expected histogram. In fact, such histograms are similar in shape and relatively straightforward to model.

An illustrative embodiment is described using a simple 2×3 bitmap having only three possible gray levels with a known expected histogram of gray levels.

The illustrative embodiments provide for an optimized print-scan model using histogram constraints for an input image having a known expected histogram. Simple traditional histogram matching programs sort the pixels of two images and then adjust the gray levels of one image in order to match the histogram of the second image.

In the illustrative embodiment described here, the system utilizes a known histogram of a particular category of images to constrain a probabilistic print-scan model in order to provide a more accurate print-scan model. A probability function p(A;k,g) is defined that given a two-dimensional grayscale bitmap input image A provides the probability that a particular pixel k of A will have a particular gray level g.

A measure m(A,B) for a first image (given input image A) and a second image (expected output image B) is some way, based upon the probabilistic print-scan model p, of determining whether the two images (A,B) are "close together." For example, how close is the image B from a print-scan of the image A. Images with small values of m are "far apart." Here, the objective is to generate an image that is close to a given image, e.g., with a large value of m, but that also has a predetermined histogram. Several measures can be defined that take into account the exact p(A; k,g) where the pixel k of image B has gray value g.

For example, one possible measure is to sum the probabilities $m(A,B)=Sum_k (p(A; k,g))$. In such a measure, the larger the m(A,B) value, then the closer B is to a print-scan of A. Another alternative measure is to multiply the probabilities. Such a measure takes the form of the probability measure extended from p. Yet another alternative measure is $m(A,B)=(1/N)*(Sum\ 1/p(k,g))-1$ where N is the total number of pixels. Such a measure satisfies the properties of distance because the smaller the measure m(A,B), then the closer B is to a print-scan of A. Many other combinations of the probabilities may be taken as measures and some of them may need to be rescaled such as by raising them to the power of a small value because they may become too small to be processed by a computer (especially the second measure above using multiplication).

The optimal maximal measure problem can be restated as an integer programming problem of class NP and it quickly becomes intractable as the size of the image and the number of gray levels increase. Accordingly, except for trivial problems the maximal solution is computationally difficult and prohibitive. Such measures can be used in a brute force approach for appropriate inputs. In view of the computational difficulty of the maximal measure, the following process utilizes an algorithm that is polynomial in size and that returns an image B with a large measure of m(A,B), but one that may not be maximal.

Here, an expected target histogram $h_{Target}$ (g) is input into the system and used to constrain or modify the probabilistic print-scan model for input image A to produce a deterministic print-scan model. The constrained model predicts the output image B produced from input image A with generally more accuracy than simply selecting the highest probability gray level for each pixel from the probabilistic model p(A;k,g).

The system defines the pixels k of A in one dimension and the probability function can be represented itself as a three dimensional histogram H of values p for indices k and g. The system applies an iterative process in which the highest probability p is selected. For the selected p, the corresponding output pixel of B is filled with g. Then, all remaining pairs of H having pixel value k are removed from H. Furthermore, if using that gray level g reached the expected number of pixels $h_{Target}$ (g) of that gray level in the histogram of B, then all remaining pairs of H having that gray level g are removed from H. The process then returns to pick the next highest probability until B is completely filled.

Figure 2:
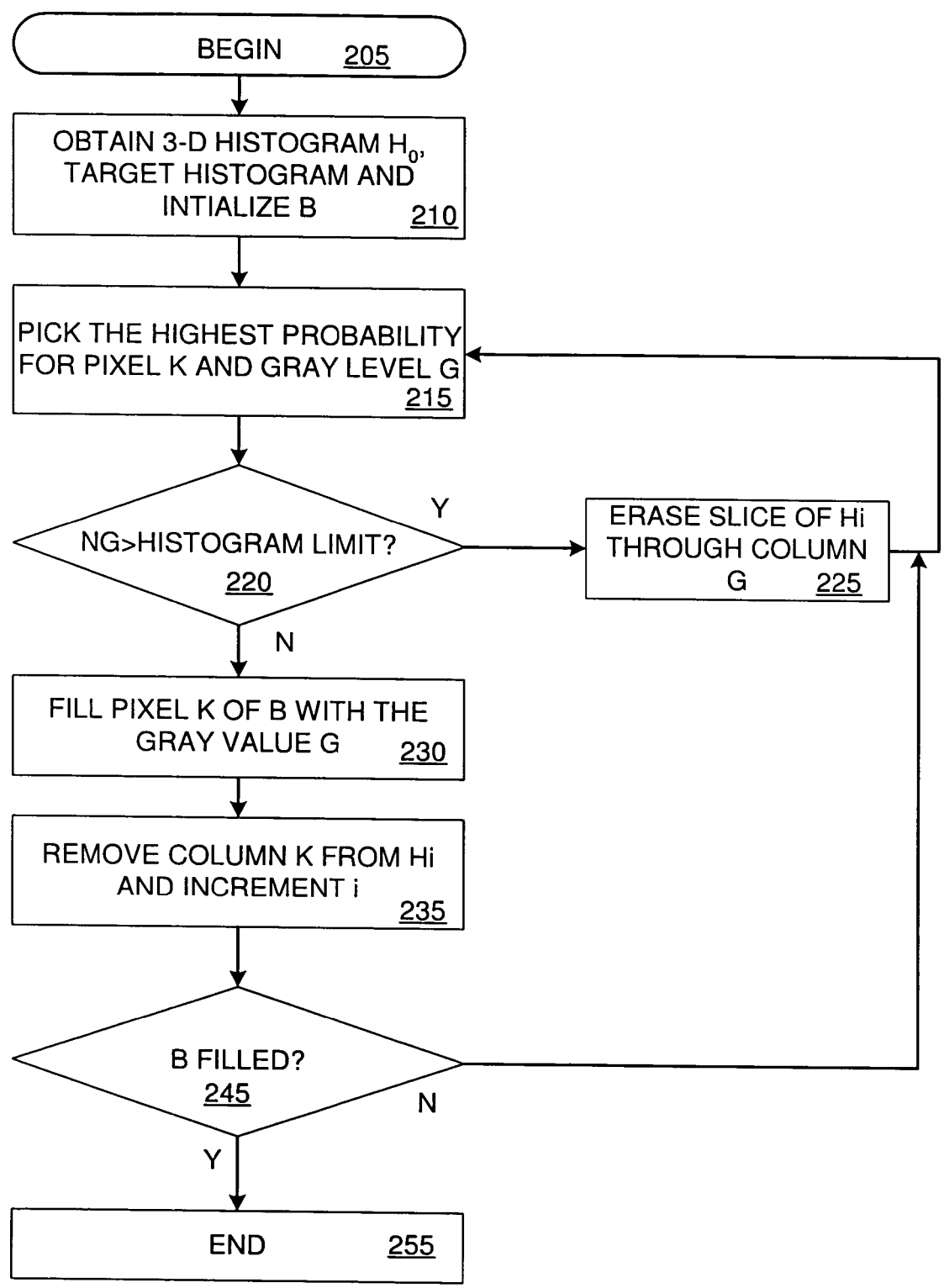
FIG. 2 is a flowchart showing a method for optimizing a print-scan simulation using histogram constraints according to an illustrative embodiment of the present application.

Referring to FIG. 2, a flowchart showing a method for optimizing a print-scan simulation using histogram constraints 200 according to an embodiment of the present application is shown. In step 205, the histogram constrained print-scan model begins. In step 210, the system obtains the 3-D histogram $H_0$ of p, the target histogram $h_{Target}$ and a blank output image B (such as for instance with gray values initialized to −1). The following steps are then iterated i times to modify B and $H_i$ until the expected output image B is filled. In step 215, the system picks the highest point in the histogram that corresponds to the highest probability. If during any such determination of the highest probability there are more than one point with the same highest probability, the system can interpolate the histogram into a continuous surface in such a way that there is only one highest point. Let (K,G) be the pixel index and gray value corresponding to this highest point. The system also increments the number of pixels of B with gray value G (NG) by 1. In step 220, the system determines if nG reaches NG (the number of pixels with gray value G prescribed by the histogram model). If so, the system proceeds to step 225 and erases from Hi the entries (k,G,p(k,G)) for all the k's (that is the slice of Hi through column G) and returns to step 215 to pick the next largest probability.

In step 230, the system fills pixel K of expected output image B with the gray value G. In step 235, the SYSTEM erases from Hi the entries (K,g,p(K,g)) for all of the g's (that is the slice of Hi through row K). The resulting histogram is Hi+1. In step 245 the system determines if the expected output image B is filled and if so stops. If B is not filled, the process returns to step 215.

Figure 3:
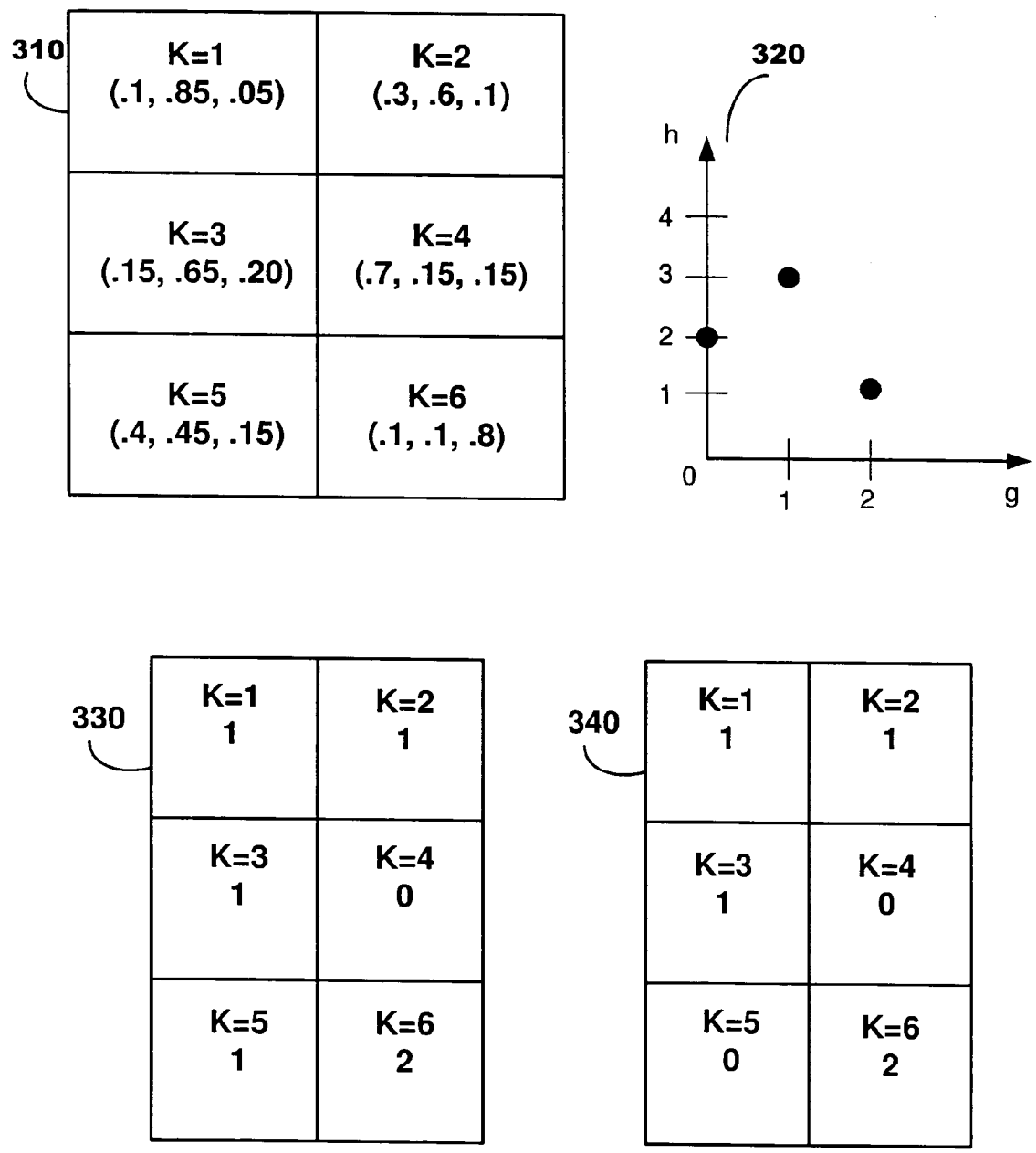
FIG. 3 is a block diagram showing an illustrative simple input image with a probabilistic print-scan model, a target histogram and an output image according to an illustrative embodiment of the present application.

Referring to FIG. 3 a block diagram 300 showing an illustrative simple input image with a probabilistic print-scan model 310, a target histogram 320, an output image 330 according to an illustrative embodiment of the present application is shown. Additionally, the output image 340 that would result without the histogram constraint is shown for comparison.

As can be appreciated, image A has 6 pixels k=1-6 that have three possible gray levels (0-2). The probability matrix 310 includes the probabilities for each pixel to have each of the particular gray levels given input image A. The process described above is applied to determine output image B using the histogram constraints. As can be appreciated by a comparison with output image C 340, the traditional method of selecting the higher probability for each pixel without histogram constraints produces a different predicted image. In another example, the histogram may be a straight horizontal line.

In an alternative, the model may be applied to simulate repeated print-scan cycles or generations. In another alternative, the scanner 34 includes existing OCR/barcode scanning systems such as a Wide Field Of View (WFOV) postal processing camera used in current United States Postal Service (USPS) equipment.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A computer implemented method for simulating an output image using an input image, a print-scan model with histogram constraints comprising:
    obtaining a probabilistic print-scan model for simulating the output image;
    obtaining an expected histogram of the input image; and
    iteratively applying a histogram constraint to the probabilistic model using the computer to obtain a histogram constrained print-scan model;
    performing a print-scan simulation using the computer by using the input image and the histogram constrained print-scan model to predict the output image,
    wherein the input image is a copy detection pattern,
    wherein the input image includes k pixels in a vector format assigned a gray level from a range of gray levels; and
    the probabilistic print-scan model includes a 3-D histogram of probabilities with indexes for the k pixels and the range of gray levels.

2. The method according to claim 1, wherein the input image is a gray scale image.

3. The method according to claim 1, wherein the expected histogram comprises a 2-D histogram of expected gray values of the input image.

4. The method according to claim 3, wherein the histogram constraint comprises:
    (a) selecting the highest probability fro the 3-D histogram;
    (b) determining if the 2-D histogram limit for the corresponding gray level has been exceeded;
    (c) if the 2-D histogram limit for the corresponding gray level has been exceeded, removing the 3-D histogram column associated with that gray level;
    (d) assigning the corresponding gray level to the corresponding pixel in the output image;
    (e) removing the associated pixel row from the 3-D histogram; and
    (f) repeating (a)-(e) until the output image is filled.

5. The method according to claim 1, wherein the expected histogram is determined by scanning and processing a sample image in the same category as the input image.

6. The method according to claim 1, wherein the expected histogram is obtained from a third party.

7. A computer implemented method for simulating an output image expected for a printer and an output media using an input image and a print-scan model with histogram constraints comprising:
    obtaining a probabilistic print-scan model for simulating the output image, wherein the probabilistic print-scan model is associated with a printer type associated with the printer and a media type associated with the output media;
    obtaining an expected histogram of the input image, wherein the expected histogram is associated with a category of images having similar histograms, the particular category being associated with the input image;
    iteratively applying a histogram constraint to the probabilistic model using the computer to obtain a histogram constrained print-scan model for the printer, the output media and the category of images; and
    performing a print-scan simulation using the computer with the input image and the histogram constrained print-scan model to produce a predicted the output image,
    wherein the input image is a copy detection pattern,
    wherein the input image includes k pixels in a vector format assigned a gray level from a range of gray levels; and
    the probabilistic print-scan model includes a 3-D histogram of probabilities with indexes for the k pixels and the range of gray levels.

8. The method according to claim 7, further comprising; displaying the predicted output image.

9. The method according to claim 7, further comprising; printing the predicted output image.

10. The method according to claim 7, wherein the expected histogram comprises a 2-D histogram of expected gray values of the input image.

11. The method according to claim 7, wherein the histogram constraint comprises:
    (a) selecting the highest probability fro the 3-D histogram;
    (b) determining if the 2-D histogram limit for the corresponding gray level has been exceeded;
    (c) if the 2-D histogram limit for the corresponding gray level has been exceeded, removing the 3-D histogram column associated with that gray level;
    (d) assigning the corresponding gray level to the corresponding pixel in the output image;
    (e) removing the associated pixel row from the 3-D histogram; and
    (f) repeating (a)-(e) until the output image is filled.

* * * * *

UNITED STATES PATENT AND TRADEMARK OFFICE
CERTIFICATE OF CORRECTION

PATENT NO. : 7,586,627 B2  Page 1 of 1
APPLICATION NO. : 11/241293
DATED : September 8, 2009
INVENTOR(S) : Haas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 957 days.

Signed and Sealed this

Twenty-first Day of September, 2010

David J. Kappos
*Director of the United States Patent and Trademark Office*